United States Patent
Ogawa et al.

(10) Patent No.: US 12,151,273 B2
(45) Date of Patent: Nov. 26, 2024

(54) SPRINGBACK AMOUNT DISCREPANCY FACTOR PORTION IDENTIFICATION METHOD AND APPARATUS

(71) Applicant: JFE STEEL CORPORATION, Tokyo (JP)

(72) Inventors: Takeshi Ogawa, Tokyo (JP); Masaki Urabe, Tokyo (JP); Eiji Iizuka, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 525 days.

(21) Appl. No.: 17/606,202

(22) PCT Filed: Apr. 16, 2020

(86) PCT No.: PCT/JP2020/016698
§ 371 (c)(1),
(2) Date: Oct. 25, 2021

(87) PCT Pub. No.: WO2020/218145
PCT Pub. Date: Oct. 29, 2020

(65) Prior Publication Data
US 2022/0219217 A1   Jul. 14, 2022

(30) Foreign Application Priority Data

Apr. 25, 2019   (JP) ................. 2019-083661

(51) Int. Cl.
*B21D 22/02* (2006.01)
*G01B 21/20* (2006.01)
(Continued)

(52) U.S. Cl.
CPC ............. *B21D 22/02* (2013.01); *G01B 21/20* (2013.01); *G06F 30/10* (2020.01); *G06F 30/23* (2020.01)

(58) Field of Classification Search
CPC ......... B21D 22/02; G06F 30/23; G06F 30/10; G01B 21/20
See application file for complete search history.

(56) References Cited

U.S. PATENT DOCUMENTS

| | | | |
|---|---|---|---|
| 2010/0005845 A1* | 1/2010 | Yoshida | .................. G06F 30/23 |
| | | | 72/31.01 |
| 2014/0172391 A1 | 6/2014 | Tokita et al. | |

FOREIGN PATENT DOCUMENTS

| | | |
|---|---|---|
| EP | 2 975 377 A1 | 1/2016 |
| JP | H0575633 U | 10/1993 |

(Continued)

OTHER PUBLICATIONS

Hiramoto, J. et al. "Improvement of Shape Accuracy in Press-Formed Parts of High-Strength Steel by Springback-Root-Cause Analysis," Key Engineering Materials, vol. 725, pp. 610-615, Dec. 15, 2016.

(Continued)

*Primary Examiner* — Mohamed Charioui
*Assistant Examiner* — Christine Y Liao
(74) *Attorney, Agent, or Firm* — Oliff PLC

(57) ABSTRACT

A method and apparatus for identifying a portion that is a factor causing a discrepancy in springback amount between a press-formed product and a CAE analysis. The method includes a formed product driving stress distribution acquisition step of acquiring a driving stress distribution of a press-formed product, an analysis driving stress distribution acquisition step of acquiring a driving stress distribution of a springback analysis, a stress difference distribution setting step of setting a stress difference distribution, a stress difference springback amount acquisition step of acquiring a springback amount based on the stress difference distribution, a changed stress difference springback amount acquisition step of acquiring a springback amount by changing a (Continued)

value in a region of the stress difference distribution, and a springback amount discrepancy factor portion identification step of identifying a portion that is a factor causing a discrepancy in springback amount by comparing the acquired springback amounts.

6 Claims, 9 Drawing Sheets

(51) Int. Cl.
  *G06F 30/10* (2020.01)
  *G06F 30/23* (2020.01)

(56) References Cited

FOREIGN PATENT DOCUMENTS

| JP | 2007-229724 A | 9/2007 |
| JP | 2012-206158 A | 10/2012 |
| JP | 2013-43182 A | 3/2013 |
| JP | 2013-71120 A | 4/2013 |
| JP | 2016-087640 A | 5/2016 |
| JP | 6519639 B1 | 5/2019 |

OTHER PUBLICATIONS

Jun. 10, 2022 Extended European Search Report issued in European Patent Application No. 20795399.3.
Jun. 16, 2020 International Search Report issued in International Application No. PCT/JP2020/016698.
May 24, 2023 Office Action issued in Korean Patent Application No. 10-2021-7034409.

\* cited by examiner (a) CAE STRESS DISTRIBUTION (b) ACTUAL PANEL STRESS DISTRIBUTION (c) (CAE STRESS) − (ACTUAL PANEL STRESS) DIFFERENCE (a) (CAE STRESS) − (ACTUAL PANEL STRESS) DIFFERENCE

SPRINGBACK ANALYSIS (b) DISPLACEMENT FROM (CAE STRESS) − (ACTUAL PANEL STRESS) DIFFERENCE (a) REGION IN WHICH STRESS DIFFERENCE IS CHANGED (b) DISPLACEMENT (a) REGION IN WHICH STRESS DIFFERENCE IS CHANGED (b) DISPLACEMENT

SPRINGBACK AMOUNT DISCREPANCY FACTOR PORTION IDENTIFICATION METHOD AND APPARATUS

TECHNICAL FIELD

This application relates to springback amount discrepancy factor portion identification method and apparatus for identifying a portion of a press-formed product formed of an actual panel, the portion being a factor that causes a discrepancy in springback amount between the press-formed product and a CAE analysis.

BACKGROUND

High form accuracy is required for products formed by press forming metal sheets. In order to satisfy a required form accuracy, it is important to reduce springback caused by elastic deformation of a formed product taken out from a die after press forming.

The internal stress of a formed product at the bottom dead center affects the behavior of the springback, and thus, it is effective to comprehend which portion of a formed product has a stress that affects springback and how the stress affects the springback at taking measures against the springback.

As an example of the method, in the press forming analysis method disclosed in Patent Literature 1, an analysis is performed by using the finite-element method.

According to the press forming analysis method described in Patent Literature 1, "the manner in which a defined amount relating to springback changes before and after changing the distribution of a residual stress in a region of an object to be press-formed, which will become a press-formed product, is calculated, and thus, the influence of the residual stress in a region of the object to be press-formed that has not yet been released from a die on springback can be estimated on the basis of the calculation result" (see Advantageous Effects).

By using a method such as that disclosed in Patent Literature 1, a measure against springback can be considered before manufacture of an actual die, and a die adjustment operation for ensuring form accuracy can be greatly reduced.

As another method for analyzing a factor in springback using the CAE analysis, Patent Literature 2 discloses a method in which the springback (SB) effective stress is calculated from the residual stress before a press-formed product is released from a die and the residual stress after the press-formed product has been released from the die and in which a factor analysis is performed by using the SB effective stress, so that a more appropriate evaluation is performed.

In the above-mentioned method, a springback analysis is performed by using the stress state calculated from a data setting in the CAE analysis. In contrast, Patent Literature 3 discloses a method in which a measured three-dimensional shape generated by measuring the surface shape of a formed product that has been actually press-formed is loaded into the CAE analysis, in which a stress distribution state is obtained by performing a mechanical analysis of a state in which the measured three-dimensional shape is sandwiched by a die model to a forming bottom dead center, and in which a factor analysis is performed by using the stress distribution state, so that a more accurate evaluation is performed.

CITATION LIST

Patent Literature

PTL 1: Japanese Unexamined Patent Application Publication No. 2007-229724
PTL 2: Japanese Unexamined Patent Application Publication No. 2012-206158
PTL 3: Japanese Unexamined Patent Application Publication No. 2013-71120

SUMMARY

Technical Problem

However, even if a die in which measures against springback that are based on a CAE analysis are introduced is manufactured and press forming is performed, the shape of an actual press-formed product may sometimes be different from the shape expected to be obtained by the measures taken.

This situation may occur when, for example, a forming load assumed by the CAE analysis is not applied to a metal sheet, or the CAE analysis cannot accurately reproduce the stress state before press-formed product is released from the die depending on the shape of the die used for the press forming and various forming conditions. In such a case, it is necessary to adjust the die used for the press forming and the forming conditions or to review the settings of the CAE analysis and the shape of the die.

In such an adjustment operation, it is required to identify a portion of a formed product in which a factor that causes a discrepancy between a springback analysis result obtained by the CAE analysis and the actual springback amount of the formed product has occurred. The methods disclosed in Patent Literatures 1 to 3 are used for identifying a portion that is a factor directly causing springback and not for identifying a portion that is a factor causing a discrepancy between the CAE analysis and the actual springback amount.

In addition, in order to ensure the usefulness of measures against springback that are based on a CAE analysis, it is required to improve the reproducibility of a springback analysis so as not to be discrepant from the actual springback of a formed product. For this purpose, it is necessary to identify a portion of a formed product that is a factor causing such a discrepancy.

The disclosed embodiments have been made to solve such a problem mentioned above, and it is an object of the disclosed embodiments to provide a springback amount discrepancy factor portion identification method and apparatus for identifying a portion of a press-formed product formed of an actual panel, the portion being a factor that causes a discrepancy in springback amount between the press-formed product and a CAE analysis.

Solution to Problem (1) A springback amount discrepancy factor portion identification method according to the disclosed embodiments is a method for identifying a portion of a shape of a press-formed product, which is formed by press forming an actual panel, the portion being a factor causing a discrepancy between an amount of springback occurred in the press-formed product and an amount of springback obtained by a springback analysis that is performed on an analysis model having a shape the same as the shape of the press-formed product, and the method includes a formed product driving stress distribution acquisition step of generating a press-formed product model by using three-dimensional shape measurement data obtained by measuring a surface shape of the press-formed product after the press-formed product has been released from a die, performing a mechanical analysis in a state where the press-formed product model is sandwiched by a die model to a forming bottom dead center, and acquiring a stress distribution at the forming bottom dead center as a driving stress distribution contributed to the springback in the press-formed product, an analysis driving stress distribution acquisition step of acquiring a stress distribution at the bottom dead center in the springback analysis and a residual stress distribution after the press-formed product has been released from the die and acquiring a difference between the stress distribution at the bottom dead center and the residual stress distribution after the press-formed product has been released from the die as a driving stress distribution in the springback analysis, a stress difference distribution setting step of obtaining a stress difference distribution from a difference between an analysis driving stress distribution acquired in the analysis driving stress distribution acquisition step and a formed product driving stress distribution acquired in the formed product driving stress distribution acquisition step and setting the stress difference distribution to the shape of the formed product at the bottom dead center in the springback analysis, a stress difference springback amount acquisition step of acquiring a springback amount by performing a springback analysis based on the set stress difference distribution, a changed stress difference springback amount acquisition step of changing a stress difference value in a region of the stress difference distribution set in the stress difference distribution setting step and acquiring a springback amount by performing a springback analysis based on the changed stress difference distribution, and a springback amount discrepancy factor portion identification step of identifying a portion of a shape of a formed product, the portion being a factor causing a discrepancy in springback amount between the press-formed product and the springback analysis, by comparing the springback amount acquired in the changed stress difference springback amount acquisition step and the springback amount acquired in the stress difference springback amount acquisition step.

(2) In addition, in the changed stress difference springback amount acquisition step in the method described in (1), a stress difference value is changed by eliminating a component in at least one direction from the stress difference distribution, multiplying the component in the at least one direction by a constant in the stress difference distribution, adding a constant to the component in the at least one direction in the stress difference distribution, raising the component in the at least one direction to the power of a constant in the stress difference distribution, replacing the component in the at least one direction in the stress difference distribution with an average value in a sheet thickness direction of a work material, or replacing the component in the at least one direction in the stress difference distribution with a median value in the sheet thickness direction of the work material.

(3) A springback amount discrepancy factor portion identification apparatus according to the disclosed embodiments is an apparatus that identifies a portion of a shape of a press-formed product, which is formed by press forming an actual panel, the portion being a factor causing a discrepancy between an amount of springback occurred in the press-formed product and an amount of springback obtained by a springback analysis that is performed on an analysis model having a shape the same as the shape of the press-formed product, and the apparatus includes a formed product driving stress distribution acquisition unit for generating a press-formed product model by using three-dimensional shape measurement data that is obtained by measuring a surface shape of the press-formed product after the press-formed product has been released from a die, performing a mechanical analysis in a state where the press-formed product model is sandwiched by a die model to a forming bottom dead center, and acquiring a stress distribution at the forming bottom dead center as a driving stress distribution contributed to the springback in the press-formed product, an analysis driving stress distribution acquisition unit for acquiring a stress distribution at the bottom dead center in the springback analysis and a residual stress distribution after the press-formed product has been released from the die and acquiring a difference between the stress distribution at the bottom dead center and the residual stress distribution after the press-formed product has been released from the die as a driving stress distribution in the springback analysis, a stress difference distribution setting unit for obtaining a stress difference distribution from a difference between an analysis driving stress distribution acquired by the analysis driving stress distribution acquisition unit and a formed product driving stress distribution acquired by the formed product driving stress distribution acquisition unit and setting the stress difference distribution to the shape of the formed product at the bottom dead center in the springback analysis, a stress difference springback amount acquisition unit for acquiring a springback amount by performing a springback analysis based on the set stress difference distribution, a changed stress difference springback amount acquisition unit for changing a stress difference value in a region of the stress difference distribution set by the stress difference distribution setting unit and acquiring a springback amount by performing a springback analysis based on the changed stress difference distribution, and a springback amount discrepancy factor portion identification unit for identifying a portion of a shape of a formed product, the portion being a factor causing a discrepancy in springback amount between the press-formed product and the springback analysis, by comparing the springback amount acquired by the changed stress difference springback amount acquisition unit and the springback amount acquired by the stress difference springback amount acquisition unit.

(4) In addition, the changed stress difference springback amount acquisition unit of the apparatus described in (3) changes a stress difference value by eliminating a component in at least one direction from the stress difference distribution, multiplying the component in the at least one direction by a constant in the stress difference distribution, adding a constant to the component in the at least one direction in the stress difference distribution, raising the component in the at least one direction to the power of a constant in the stress difference distribution, replacing the component in the at least one direction in the stress difference distribution with an average value in a sheet thickness direction of a work material, or replacing the component in the at least one direction in the stress difference distribution with a median value in the sheet thickness direction of the work material.

Advantageous Effects

According to the disclosed embodiments, a portion that is a factor causing a discrepancy between a springback analysis using a CAE analysis and the actual amount of springback occurred in a formed product can be identified. Thus, the load of adjustment operation for the actual press forming die and for forming conditions can be reduced, and the usefulness of measures against springback that are based on the CAE analysis can be improved.

DETAILED DESCRIPTION

Figure 2:
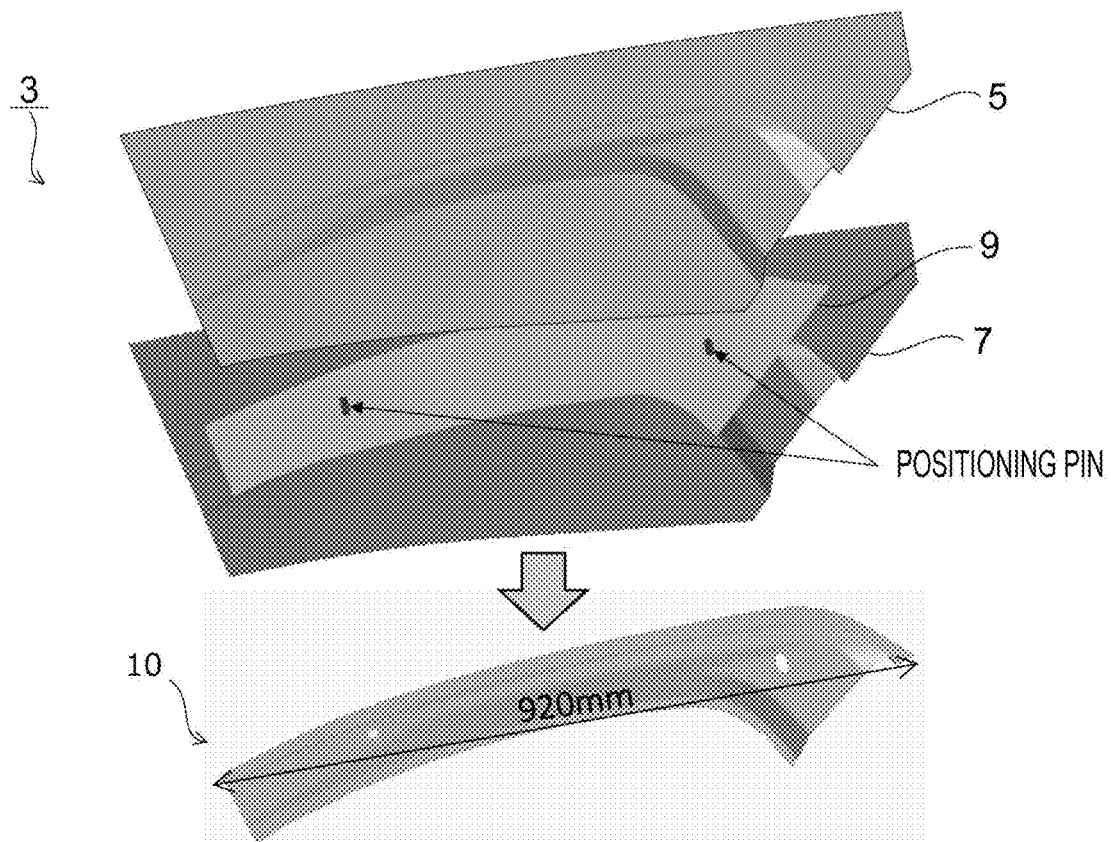
FIG. 2 is a diagram illustrating a press-formed product in the first embodiment.

In press forming of a press-formed product 10 that is illustrated in FIG. 2 as an example, there may sometimes be a difference (discrepancy) between the amount of springback calculated by a springback analysis (also called a CAE analysis) that is performed before press forming and the amount of springback of the press-formed product (also called an actual panel) that has been actually press-formed. A portion that is a factor causing such a discrepancy in springback amount between the CAE analysis and the actual panel may sometimes be different from a portion that is a factor directly causing the springback. Thus, there has been a problem in that, even if springback is reduced by taking some measures against a portion that is the factor causing springback, the discrepancy in springback amount that occurs between a CAE analysis and an actual panel is not reduced.

Accordingly, the inventor conducted extensive studies in order to solve such a problem. As a result, the inventor came up with the idea that the factor in a springback-amount discrepancy may be caused by the difference between a stress that contributed to springback in a CAE analysis and a stress that contributed to springback in an actual panel.

Accordingly, in order to verify the validity of the above-mentioned idea, a stress that contributed to springback (hereinafter also referred to as a driving stress distribution) in a CAE analysis and in an actual panel was obtained with respect to the press-formed product 10 that is illustrated in FIG. 2 and whose cross-sectional shape is a hat-like shape, and the difference between the driving stress distribution in the CAE analysis and the driving stress distribution in the actual panel (hereinafter also referred to as a stress difference distribution) was calculated. Then, a springback analysis was performed by replacing the stress difference distribution with the stress distribution at the forming bottom dead center of the CAE analysis (the details of a method of calculating a driving stress will be described in the embodiment described later).

As a springback amount, the amount of swing that is the amount of displacement in a sheet width direction of an end portion in the longitudinal direction and the amount of rebound that is the amount of displacement in a forming stroke direction are calculated (see FIG. 8), and results of comparisons of each of these amounts with the difference in springback amount (discrepancy amount) between a CAE analysis and an actual panel are shown in Table 1.

TABLE 1

|  | Amount of Swing (mm) | Amount of Rebound (mm) |
|---|---|---|
| Difference between CAE Analysis and Actual Panel (Discrepancy Amount) | −11.6 | 4.4 |
| Analytical Value from Stress Difference | −10.7 | 4.2 |

As shown in Table 1, it was confirmed that the difference in springback amount between the CAE analysis and the actual panel and the springback amount obtained by the springback analysis in which the stress difference distribution was set were approximately the same value. In other words, it was found that the stress difference, which was the difference in driving stress distribution between the CAE analysis and the actual panel, may be considered as the cause of the springback-amount discrepancy.

The springback amount discrepancy factor portion identification method according to the disclosed embodiments has been made in view of the above circumstances, and a specific method will be described in the following descriptions of the embodiments.

Note that, in the following descriptions, the term "bottom dead center" refers to the state in which a punch and a die are in contact with each other with a blank interposed therebetween (the state in which forming is completed in a CAE analysis). The term "forming bottom dead center" refers to the state in which forming is completed with an actual press die. The term "analysis bottom dead center" refers to the state in which forming is completed in a CAE analysis.

First Embodiment

Figure 1:
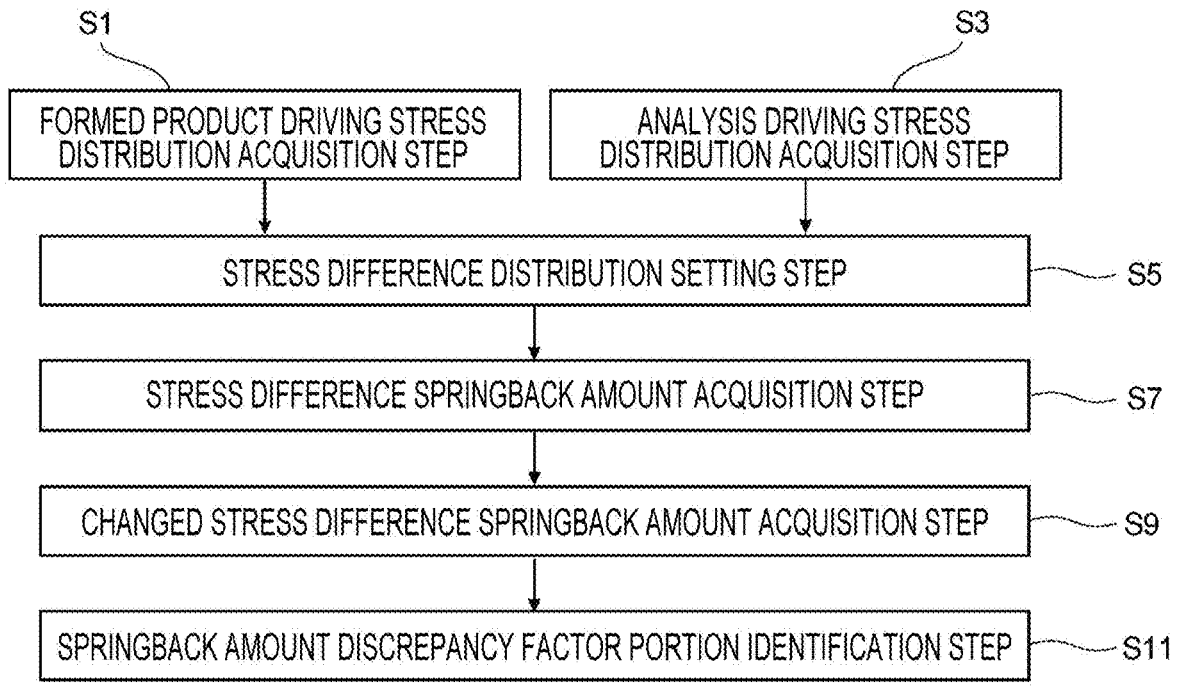
FIG. 1 is a flowchart illustrating the flow of processes of a springback amount discrepancy factor portion identification method according to a first embodiment.

In the springback amount discrepancy factor portion identification method according to the first embodiment, when there is a discrepancy between the amount of springback in a press-formed product, which is formed by press-forming an actual panel, and the amount of springback in a springback analysis, a portion of the shape of the formed product that is a factor causing this springback-amount discrepancy is identified. As illustrated in FIG. 1, the springback amount discrepancy factor portion identification method according to the first embodiment includes a formed product driving stress distribution acquisition step S1, an analysis driving stress distribution acquisition step S3, a stress difference distribution setting step S5, a stress difference springback amount acquisition step S7, a changed stress difference springback amount acquisition step S9, and a springback amount discrepancy factor portion identification step S11.

Each of the above steps will now be described by taking the case of press-forming the press-formed product 10, whose cross-sectional shape is a hat-like shape such as that illustrated in FIG. 2, as an example.

As illustrated in FIG. 2, in a CAE analysis in the present embodiment, a press forming analysis in which a blank model 9 that is a work material (a steel sheet) is sandwiched by a die model 3 that includes a die 5 and a punch 7 is performed. In the press forming analysis, the blank model 9 is fixed in place by positioning pins in the forming process as illustrated in FIG. 2, and the element size of the blank model 9 is set to about 1 mm. As analysis conditions, the friction coefficient between the blank model 9 and the die model 3 was set to 0.15, and the forming bottom dead center was positioned such that the gap between the upper and lower die models was 1.45 mm. As the work material, a 980 MPa class GA steel sheet having a sheet thickness of 1.4 mm was used.

Note that the actual panel in the present embodiment is formed by press forming performed under conditions that are the same as the forming conditions set in the CAE analysis.

<Formed Product Driving Stress Distribution Acquisition Step>

The formed product driving stress distribution acquisition step S1 is a step of acquiring a driving stress distribution in the actual panel.

More specifically, the actual panel is formed by performing press forming under conditions the same as the forming conditions such as those mentioned above that are set in the CAE analysis. After that, a press-formed product model is generated from three-dimensional shape measurement data that is obtained by measuring the surface shape of the actual panel that has been released from the die model, and a mechanical analysis in the state where the press-formed product model is sandwiched by the die model 3 illustrated in FIG. 2 to the forming bottom dead center is performed so as to obtain a stress distribution such as that illustrated in FIG. 4.

As the above-mentioned mechanical analysis, an elastic finite element analysis is performed. The stress distribution obtained by the elastic finite element analysis corresponds to the stress contributed to the springback of the actual panel, that is, the driving stress of the actual panel.

Here, for example, the method described in Patent Literature 3 can be used as a specific method for measuring the three-dimensional shape of the actual panel, generating the press-formed product model, and performing the elastic finite element analysis.

<Analysis Driving Stress Distribution Acquisition Step>

The analysis driving stress distribution acquisition step S3 is a step of acquiring a stress distribution at the bottom dead center in the CAE analysis (springback analysis) and the residual stress after the press-formed product is released from the die model and acquiring the driving stress in the CAE analysis from the difference between the obtained stress distribution at the bottom dead center and the obtained residual stress.

Although the stress at the bottom dead center of the press-formed product affects the behavior of springback, a stress remains in the press-formed product that has been released from the die. In other words, not all the stress before the press-formed product is released from the die contributes to springback, and it is assumed that the stress remaining in the press-formed product that has been released from the die and in which springback has occurred did not contribute to the springback.

In order to perform an accurate comparative analysis with the driving stress (the stress contributed to the springback) acquired in the formed product driving stress distribution acquisition step S1 it is necessary to calculate a driving stress in the CAE analysis.

Figure 3:
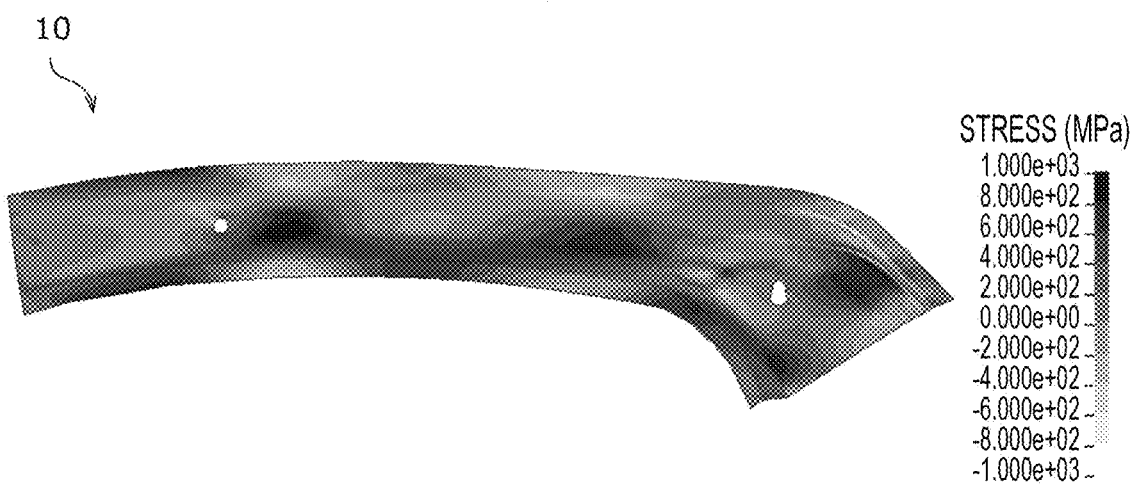
FIG. 3 is a diagram illustrating a driving stress distribution in a CAE analysis in the first embodiment.

Accordingly, in the analysis driving stress distribution acquisition step S3, the CAE analysis was performed by using the die model 3 and the blank model 9 illustrated in FIG. 2, the stress of the press-formed product before the press-formed product is released from the die (the bottom dead center) and the residual stress of the press-formed product after the press-formed product has been released from the die (after the occurrence of springback) are obtained, and the driving stress distribution (hereinafter also simply referred to as "stress distribution") in the CAE analysis such as that illustrated in FIG. 3 is calculated by subtracting the residual stress after the press-formed product has been released from the die from the stress at the bottom dead center.

Note that, in the analysis drive stress distribution acquisition step S3, a computer performs the CAE analysis. In the CAE analysis, for example, finite element method analysis software can be used. In the present embodiment, the computer executed LS-DYNA Ver. 971, which is a commercially available finite element method analysis software, so as to perform an analysis, and a dynamic explicit method was applied to a solver.

The disclosed embodiments are not limited to the case in which the die model 3 such as that illustrated in FIG. 2 is used and the case in which the press-formed product 10, whose cross-sectional shape is a hat-like shape, is a forming target, and a die model, a press-formed product, and so forth can be suitably set in accordance with the forming target.

In addition, when the residual stress after the press-formed product has been released from the die is a vanishingly small value, it is considered that the entire stress distribution at the analysis bottom dead center contributes to springback, and the stress distribution at the bottom dead center may be used as the analysis driving stress distribution.

<Stress Difference Distribution Setting Step>

Figure 4:
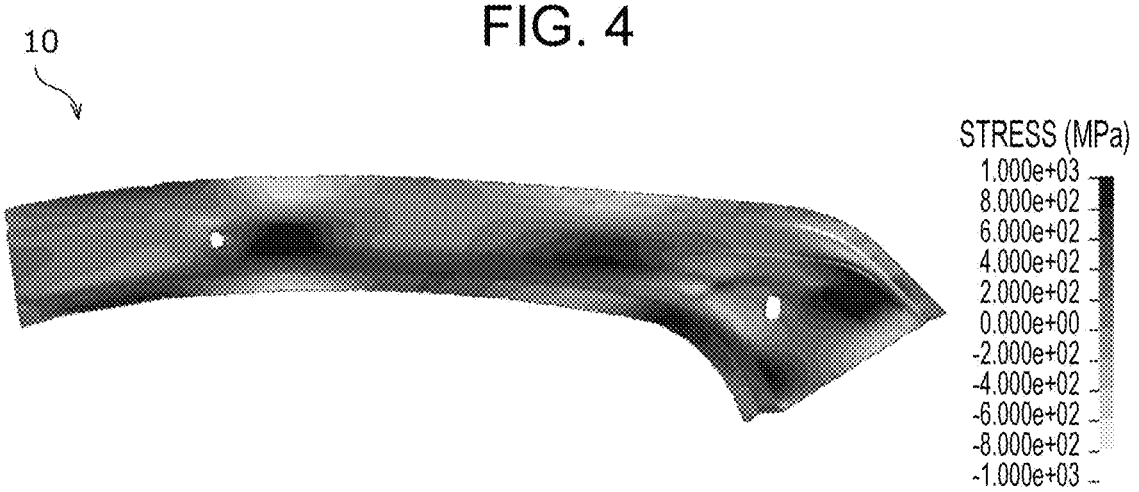
FIG. 4 is a diagram illustrating a driving stress distribution in an actual panel in the first embodiment.
Figure 5:
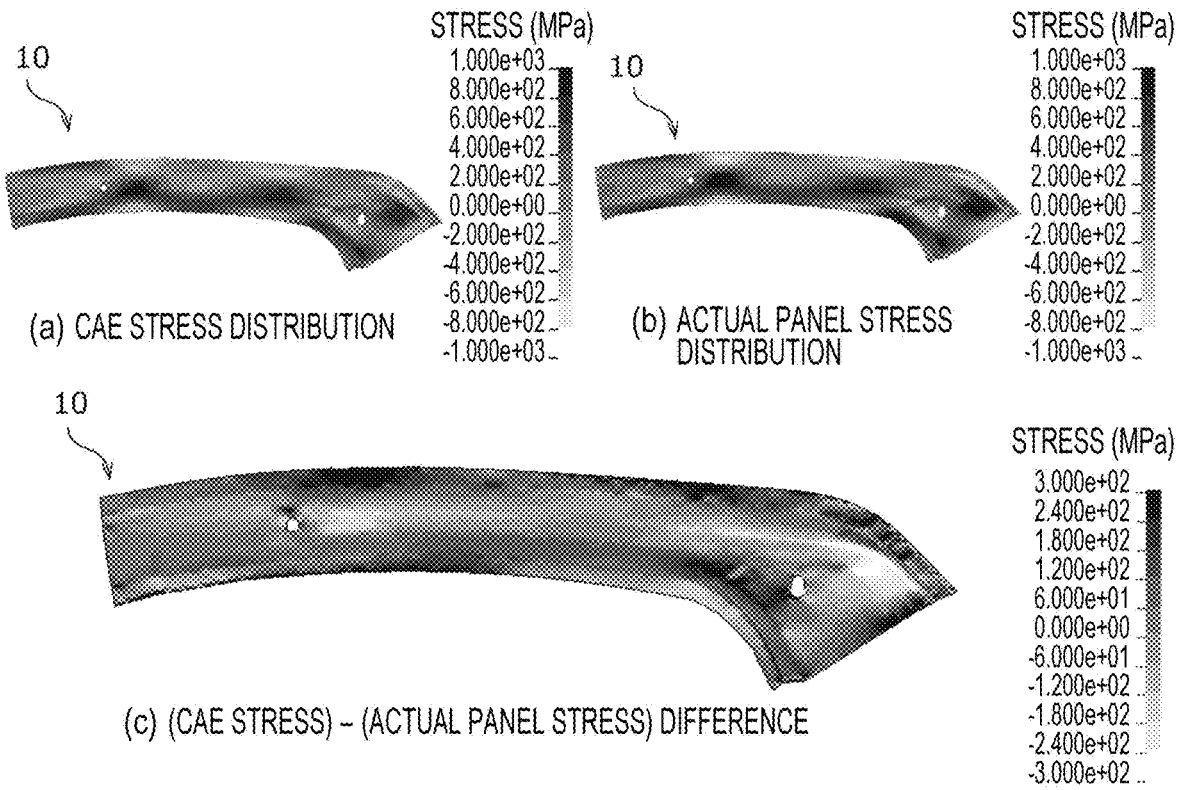
FIG. 5 includes a diagram (a) illustrating the driving stress distribution in the CAE analysis in the first embodiment, a diagram (b) illustrating the driving stress distribution in the actual panel in the first embodiment, and a diagram (c) illustrating the driving stress difference distribution between the CAE analysis and the actual panel in the first embodiment.

As illustrated in FIG. 5, the stress difference distribution setting step S5 is a step of calculating the difference between the stress distribution calculated in the analysis driving stress distribution acquisition step S3 (FIG. 3 and FIG. 5(a)) and the stress distribution calculated in the formed product driving stress distribution acquisition step S1 (FIG. 4 and FIG. 5(b)) as a stress difference distribution and setting the calculated stress difference distribution as the stress distribution in a bottom dead center shape of the CAE analysis.

Note that, in each stress distribution illustrated in FIG. 5, variations in the magnitude of a stress are represented by shades of color. In FIG. 5(c), the range of displayed colors is set to be smaller than that in FIG. 5(a) and that in FIG. 5(b). As a result, a portion having a large difference in stress (a portion close to black or white) and a portion having a small difference in stress (a portion close to the median color in the grayscale on the right-hand side in FIG. 5) can be further easily distinguished from each other.

<Stress Difference Springback Amount Acquisition Step>

The stress difference springback amount acquisition step S7 is a step of performing a springback analysis by using the stress difference distribution set in the stress difference distribution setting step S5 and calculating the amount of springback that occurs in the springback analysis.

Figure 6:
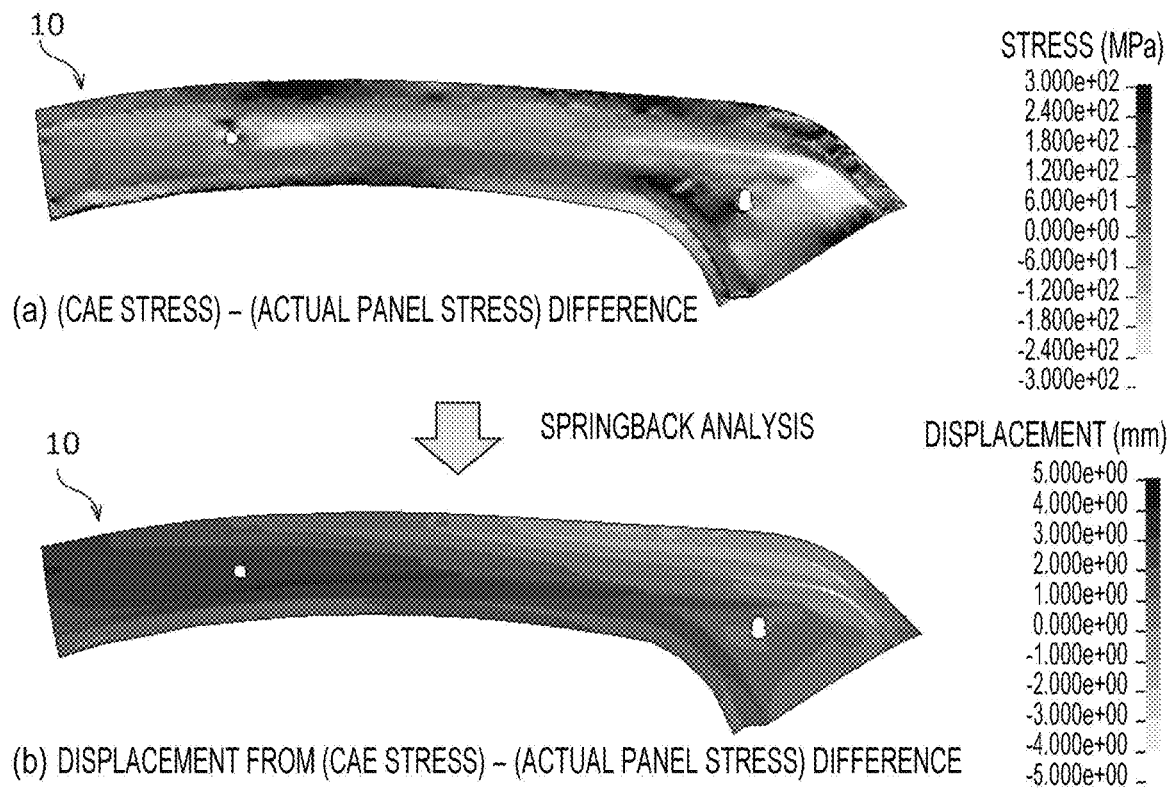
FIG. 6 includes a diagram (a) illustrating the driving stress difference distribution between the CAE analysis and the actual panel and a diagram (b) illustrating displacement calculated by a springback analysis based on the driving stress difference distribution.
Figure 7:
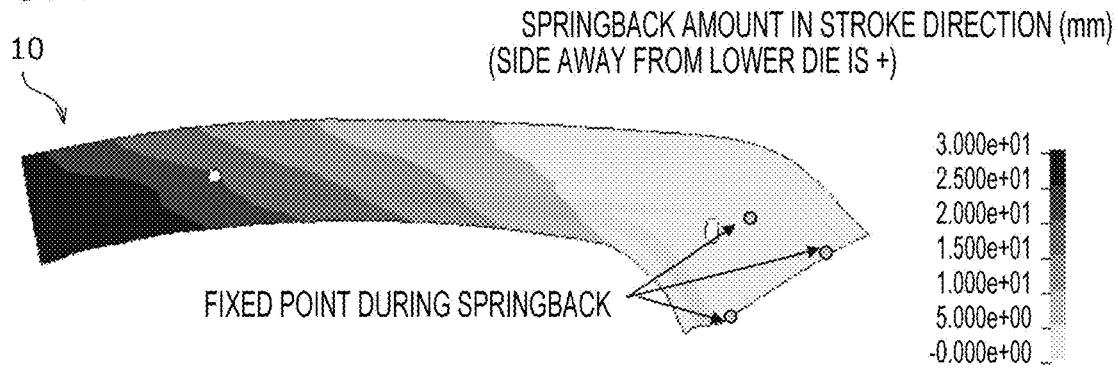
FIG. 7 is a diagram illustrating fixed points in the springback analysis in the first embodiment and a displacement analysis result obtained by the springback analysis.

In the present embodiment, the springback analysis is performed on the press-formed product 10 (FIG. 6(a)) having the bottom dead center shape in which the stress difference distribution is set, and displacement after the springback (FIG. 6(b)) is calculated by the springback analysis. In the springback analysis, as illustrated in FIG. 7, three points on one end side of the formed product were set as fixed points, and displacement caused by the springback was calculated.

Figure 8:
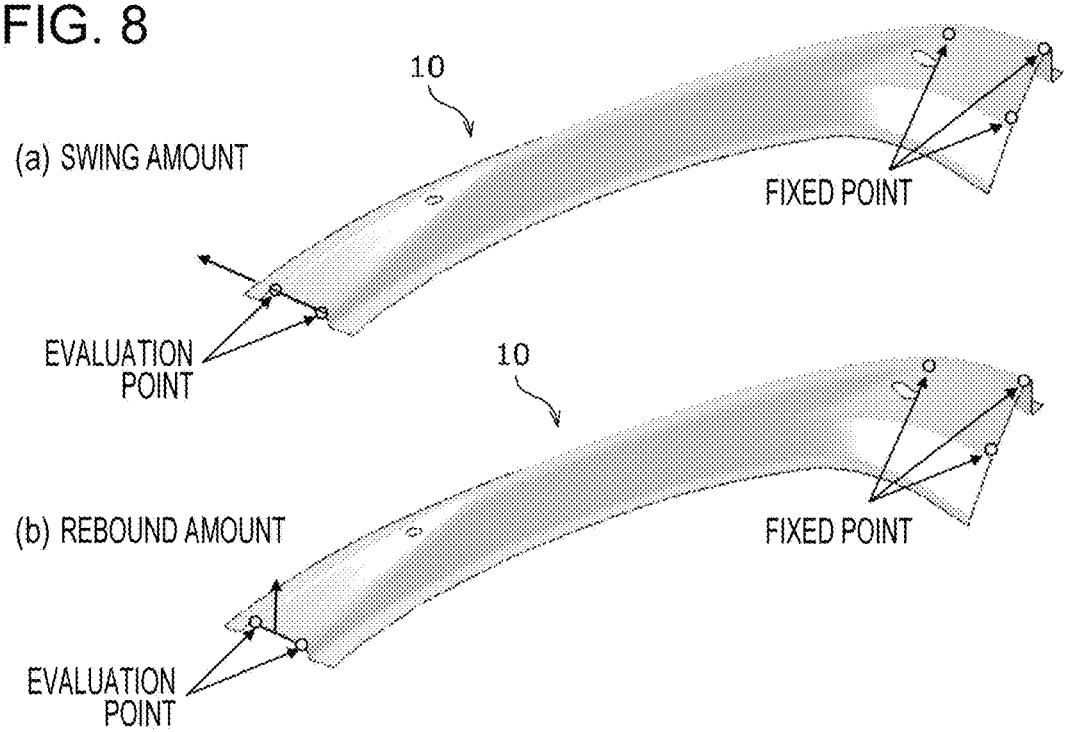
FIG. 8 is a diagram illustrating a method of calculating the amount of swing and the amount of rebound each of which is a springback amount in the first embodiment.

Next, as illustrated in FIG. 8, the amount of swing (FIG. 8(a)) and the amount of rebound (FIG. 8(b)) were calculated on the basis of the displacement calculated by the springback analysis. In the present embodiment, as illustrated in FIG. 8(a), the amount of swing was set as the amount of movement in the direction of an arrow in FIG. 8(a) (the direction of the arrow corresponding to a positive direction) caused by the springback at either of two evaluation points set on the other end side of the press-formed product 10, and as illustrated in FIG. 8(b), the amount of rebound was set as the amount of displacement in the forming stroke direction at the midpoint of the two evaluation points (the direction away from the die 5 corresponding to the positive direction).

<Changed Stress Difference Springback Amount Acquisition Step>

The changed stress difference springback amount acquisition step S9 is a step of changing the stress difference value in a portion of the press-formed product 10 in the stress difference distribution set in the stress difference distribution setting step S5 and performing a springback analysis using the stress difference distribution in which the change is made (a changed stress difference distribution) so as to calculate the amount of springback that occurs in the springback analysis.

Figure 9:
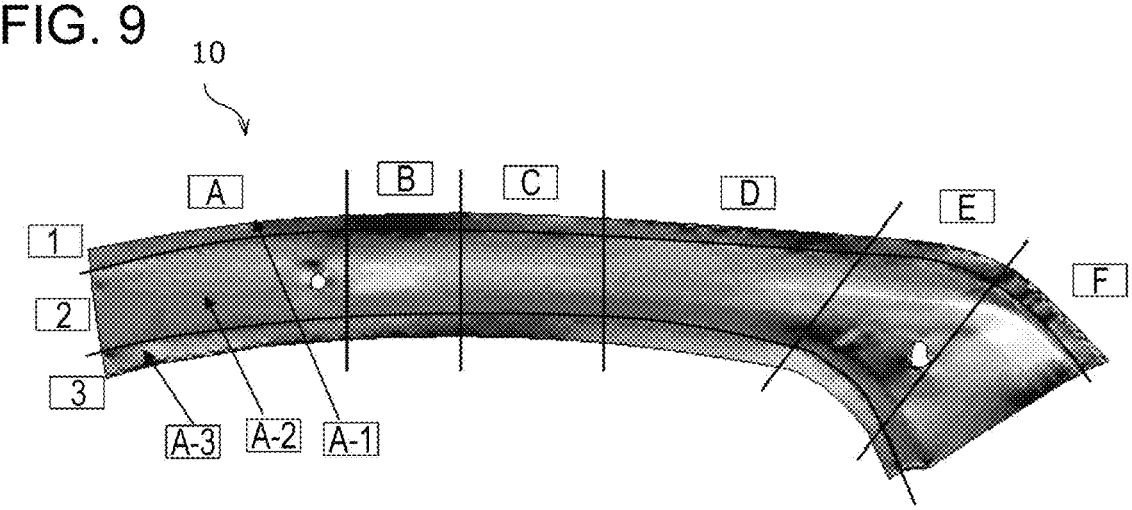
FIG. 9 is a diagram illustrating division of a formed product into regions in the first embodiment.

In the present embodiment, as illustrated in FIG. 9, the press-formed product 10 is divided into a plurality of regions (six regions A to F in the longitudinal direction and three regions 1 to 3 in the width direction), and the stress difference in each region is eliminated, that is, the stress difference value in each region is set to zero. Note that the number of regions in which the stress difference is to be eliminated does not need to be one, and the stress differences in a plurality of regions may be eliminated.

After the value in a certain region has been eliminated, a springback analysis is performed so as to calculate the amount of swing and the amount of rebound illustrated in FIG. 8 as the amount of springback.

Figure 10:
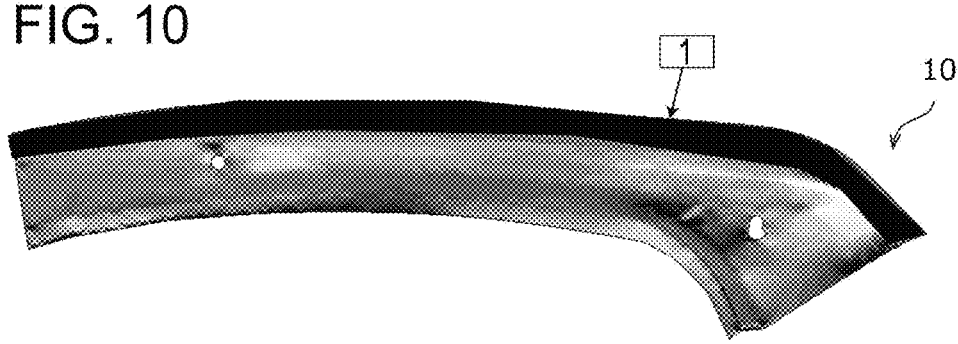
FIG. 10 includes a diagram (a) illustrating a region in which a stress difference is changed in the first embodiment and a diagram (b) illustrating displacement calculated by the springback analysis after changing the stress difference in the region.
Figure 10:
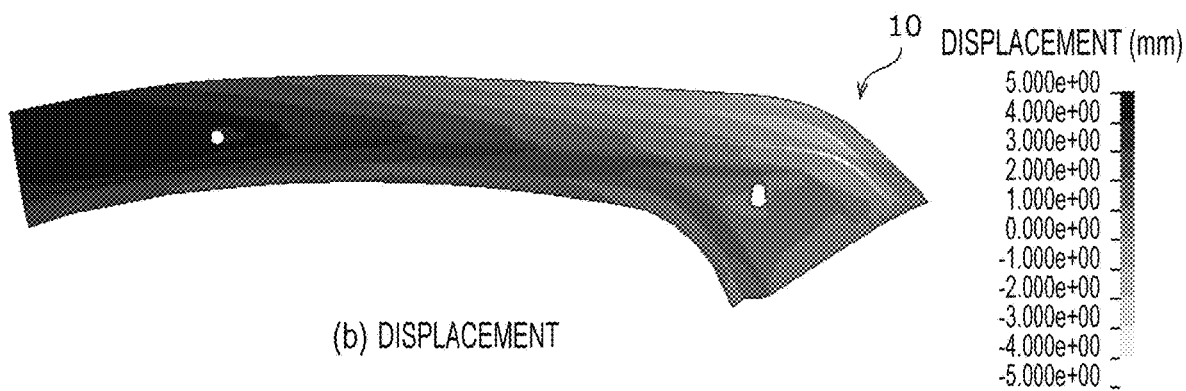

FIG. 10 illustrates displacement that is calculated by eliminating the stress difference in a region 1 (see FIG. 10(a)) from the stress difference distribution set in the stress difference distribution setting step S5 (setting the stress difference value to zero) and performing a springback analysis (see FIG. 10(b)). The amount of springback (the amount of swing and the amount of rebound) was calculated on the basis of the calculated displacement. The amount of springback in a region 2 and the amount of springback in a region 3 were also calculated (not illustrated).

Figure 11:
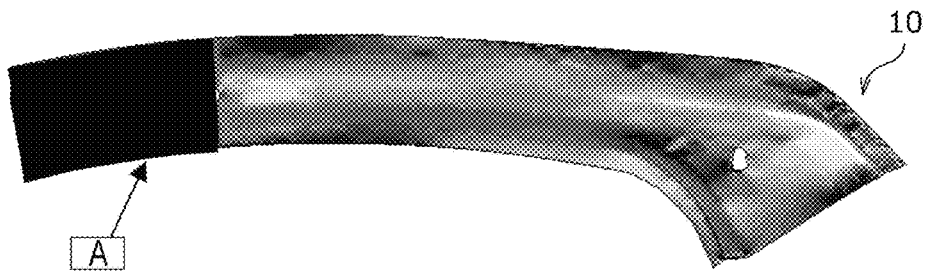
FIG. 11 includes a diagram (a) illustrating a region in which a stress difference is changed in the first embodiment and a diagram (b) illustrating displacement calculated by the springback analysis after changing the stress difference in the region.
Figure 11:
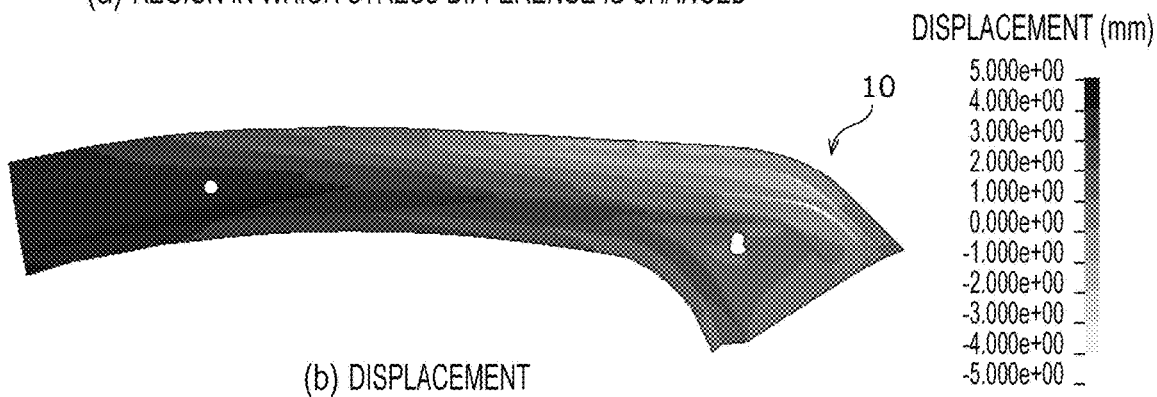

Similarly, FIG. 11 illustrates displacement that is calculated eliminating the stress difference in a region A (see FIG. 11(a)) from the stress difference distribution set in the stress difference distribution setting step S5 (setting the stress difference value to zero) and performing a springback analysis (see FIG. 11(b)). The amount of springback (the amount of swing and the amount of rebound) was calculated on the basis of the calculated displacement. The amount of springback in each of regions B to F was also calculated (not illustrated).

Figure 12:
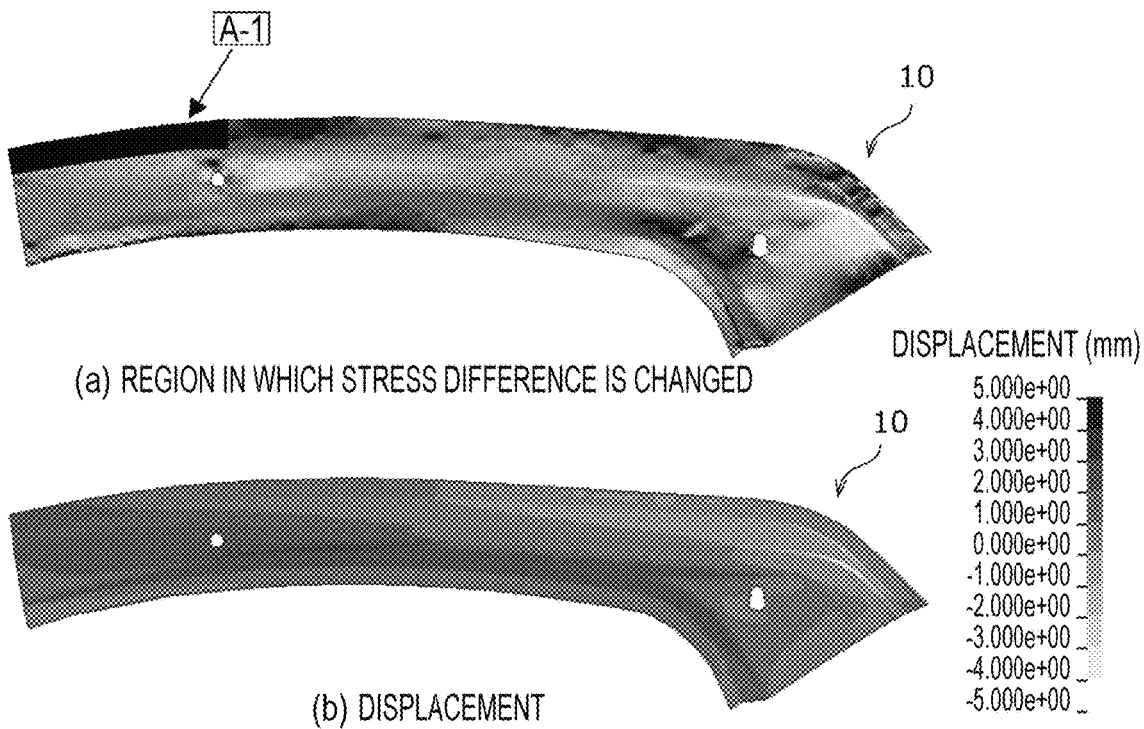
FIG. 12 includes a diagram (a) illustrating a region in which a stress difference is changed in the first embodiment and a diagram (b) illustrating displacement calculated by the springback analysis after changing the stress difference in the region.
Figure 13:
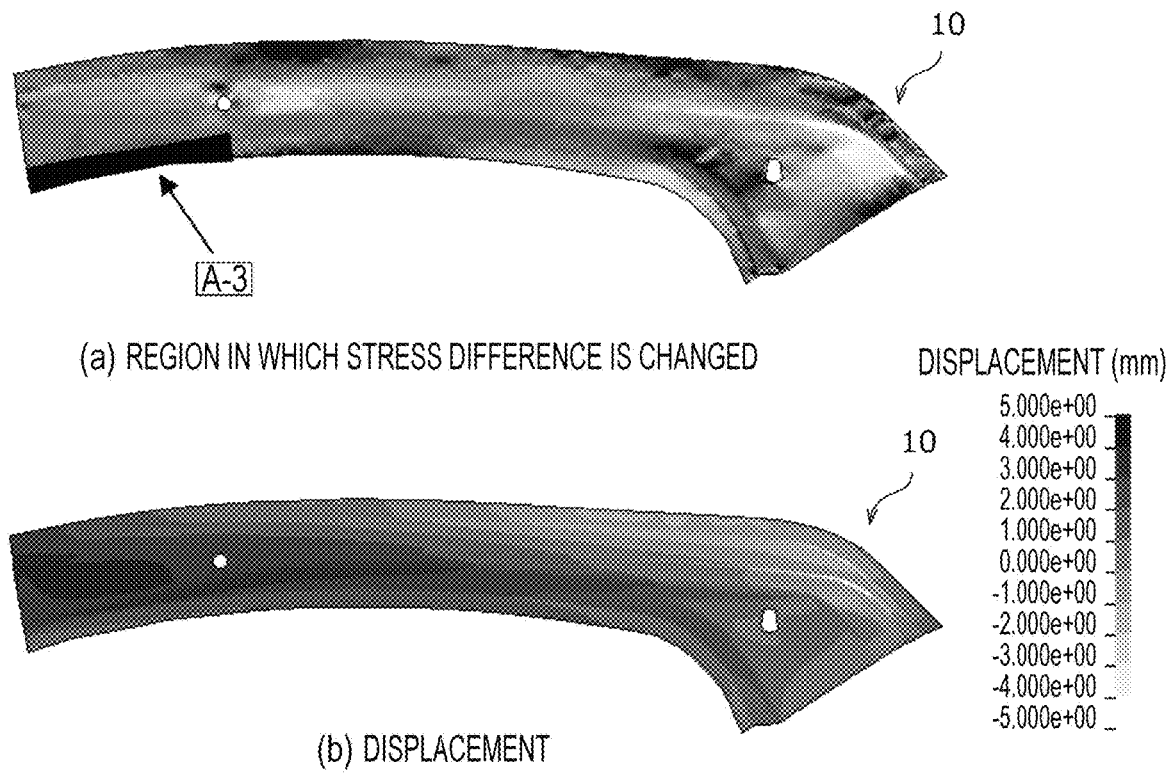
FIG. 13 includes a diagram (a) illustrating a region in which a stress difference is changed in the first embodiment and a diagram (b) illustrating displacement calculated by the springback analysis after changing the stress difference in the region.

In addition, FIG. 12 illustrates displacement that is calculated by eliminating the stress difference in a region A-1 (see FIG. 12(a)) from the stress difference distribution set in the stress difference distribution setting step S5 (setting the stress difference value to zero) and performing a springback analysis (see FIG. 12(b)), and FIG. 13 illustrates displacement that is calculated by eliminating the stress difference in a region A-3 (see FIG. 13(a)) from the stress difference distribution set in the stress difference distribution setting step S5 (setting the stress difference value to zero) and performing a springback analysis (see FIG. 13(b)). The amount of springback (the amount of swing and the amount of rebound) was calculated on the basis of the calculated displacement. The amount of springback in each of regions A-1 to F-3 was also calculated (not illustrated).

<Springback Amount Discrepancy Factor Portion Identification Step>

The springback amount discrepancy factor portion identification step S11 is a step of identifying a portion that is a factor causing a discrepancy in springback amount between the CAE analysis and the actual panel on the basis of the amount of springback calculated in the stress difference springback amount acquisition step S7 and the amount of springback calculated in the changed stress difference springback amount acquisition step S9.

Figure 14:
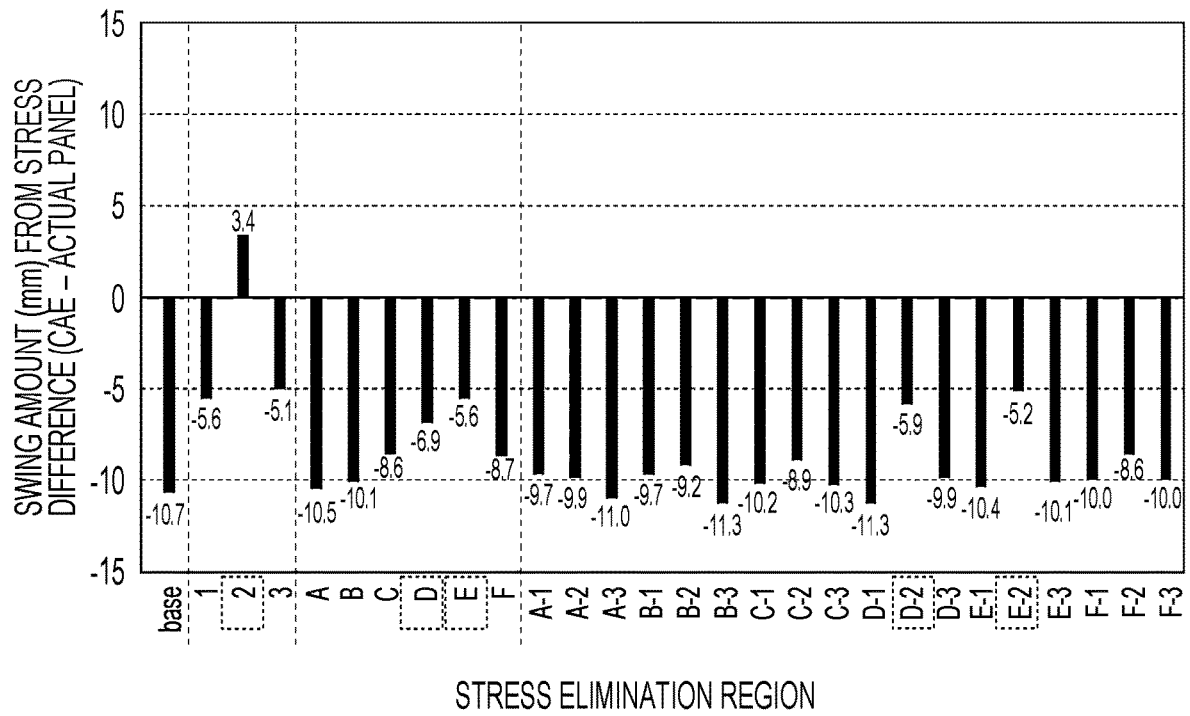
FIG. 14 is a graph illustrating a relationship between a region in which the stress difference has been eliminated and the amount of swing generated by springback when the stress difference is eliminated in the first embodiment.

FIG. 14 illustrates results of the amounts of swing calculated in the stress difference springback amount acquisition step S7 and the changed stress difference springback amount acquisition step S9. In FIG. 14, "base" is the amount of swing by the stress difference distribution in which elimination of stress is not performed, and "1" to "3", "A" to "F", and "A-1" to "F-3" are each the amount of swing by the changed stress difference distribution in which the stress difference in each region is eliminated.

The amount of swing (base) in the case where the stress difference is not changed is −10.7 mm. In contrast, referring to the amounts of swing in the stress eliminating regions, which are the regions 1 to 3, it is understood that there is a large change from the base only in the region 2 compared with the regions 1 and 3.

Similarly, referring to the amounts of swing in the stress eliminating regions, which are the regions A to F, it is understood that there is a large change from the base in the region D and the region E compared with the other regions.

Next, referring to the amounts of swing in the case where stress is eliminated in the regions A-1 to F-3, which are further subdivided regions, it is understood that the amount of swing in the region D-2 and the amount of swing in the region E-2 are reduced to be smaller than that in the base without stress elimination is not performed. As described above, the fact that the amount of swing is reduced by eliminating the stress difference in a certain region indicates that this region has a great influence on the discrepancy in the amount of swing.

This is a reasonable result from the fact that the changes in the above-mentioned region 2 and regions D and E were also large, and the region D-2 and the region E-2 can be identified as portions that cause the discrepancy in swing amount between the CAE analysis and the actual panel.

Note that the amount of swing in each region other than the region D-2 and the region E-2 is approximately equal to the amount of swing (base) when the stress difference is not changed, and thus, these regions are determined as portions each having a small influence on the discrepancy in swing amount between the CAE analysis and the actual panel.

Figure 15:
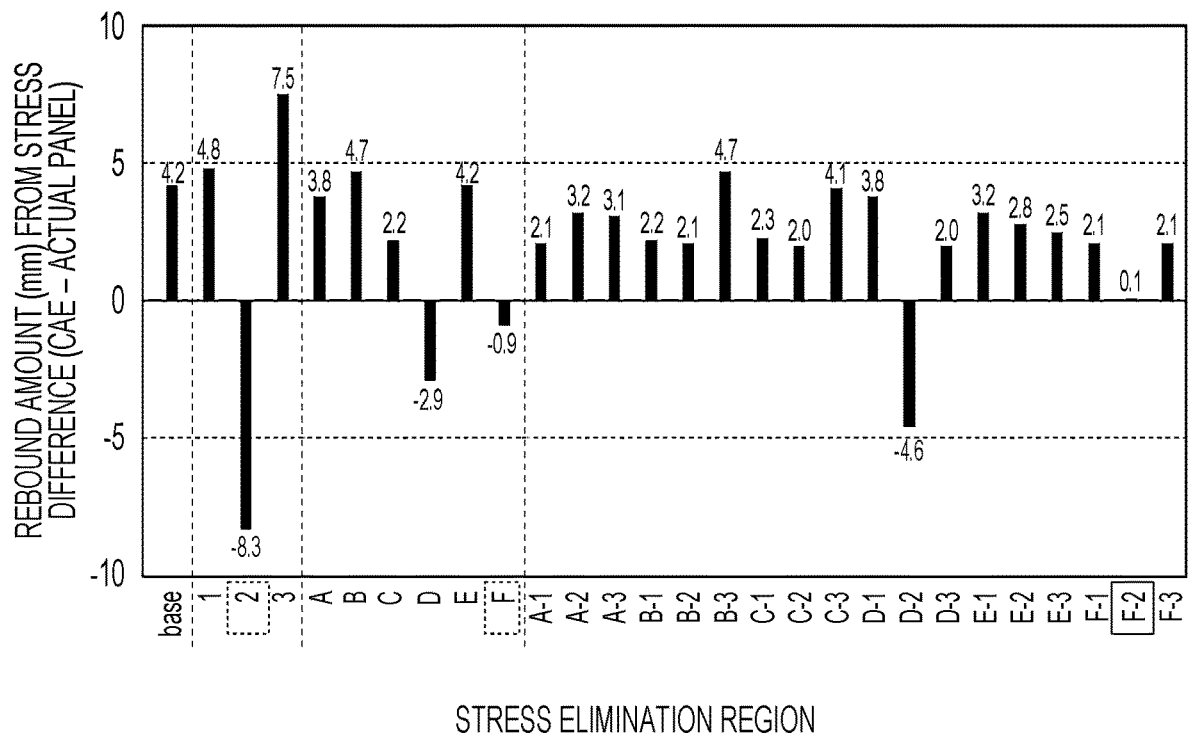
FIG. 15 is a graph illustrating a relationship between the region in which the stress difference has been eliminated and the amount of rebound generated by the springback when the stress difference is eliminated in the first embodiment.

Calculation results relating to the amount of rebound are also illustrated in FIG. 15.

The amount of rebound (base) when the stress difference is not changed is 4.2 mm. In contrast, referring to the amounts of rebound in the stress eliminating regions, which are the regions 1 to 3, it is understood that there is a large change from the base only in the region 2 (−8.3 mm) compared with the region 1 (4.8 mm) and the region 3 (7.5 mm).

Similarly, referring to the amounts of rebound in the stress eliminating regions, which are the regions A to F, it is understood that there is a large change from the base in the region D (−2.9 mm) and the region E (−0.9 mm) compared with the other regions.

Next, referring to the amounts of rebound in the case where stress is eliminated in the regions A-1 to F-3, which are further subdivided regions, it is understood that the amount of rebound (0.1 mm) in the region F-2 is greatly reduced compared to the base without stress elimination, and only small rebound occurs. Similar to the amount of swing, the fact that the amount of rebound is reduced by eliminating the stress difference in a certain region indicates that this region has a great influence on the discrepancy in the amount of rebound.

This is a reasonable result from the fact that the change in the rebound amount in each of the regions 2 and F was also large, and the region F-2 can be identified as a portion that causes the discrepancy in rebound amount between the CAE analysis and the actual panel.

Although there was a large change from the base in the region 2 and in the region D, referring to the result in the case where the stress in the subdivided region D-2 is eliminated, the amount of rebound is −4.6 mm, and compared to a rebound amount of 4.2 mm in the base without stress elimination, the rebound direction is opposite to that in the base. In addition, the rebound amount is increased.

This indicates that, by eliminating the stress difference in the region D-2, the region is a portion that is more likely to cause a discrepancy in rebound amount. In other words, it is determined that the region D-2 is a portion that suppresses, as a result of the stress difference being therein, a discrepancy in rebound amount and is not a portion that causes such a discrepancy.

Note that, in the present embodiment, although the springback amounts in the case where stress elimination was performed in all the subdivided regions A-1 to F-3 were calculated as illustrated in FIG. 14 and FIG. 15, as mentioned above, since regions that are presumed to have a large influence can be narrowed down by using the results relating to the regions 1 to 3 and the regions A to F, results that are obtained when only these regions are further subdivided may be obtained. In the case of a press-formed product having a complex shape, it is necessary to increase the number of divided regions for further subdivision, and it takes time to obtain results in all the subdivided regions. Thus, by performing an analysis while narrowing down the portions that may affect the discrepancy starting from the largely divided regions, the time taken to identify a portion that is a discrepancy factor can be reduced.

Next, the validity of determining a portion that has been identified by the springback amount discrepancy factor portion identification method according to the present embodiment to be a portion that is a factor causing a discrepancy in springback amount between a CAE analysis and an actual panel will be described.

As described above, when the press-formed product 10 illustrated in FIG. 2 is formed, the region D-2 and the region E-2 in the press-formed product 10 were identified as portions that were factors causing a discrepancy in swing amount between the CAE analysis and the actual panel. In addition, the region F-2 was identified as a portion that was a factor causing a discrepancy in rebound amount.

Accordingly, the driving stress in each of the identified portions in the driving stress distribution (see FIG. 3) obtained by the CAE analysis was replaced with the corresponding driving stress distribution in each portion of the actual panel, and a springback analysis was performed so as to determine whether the discrepancy in springback amount was reduced.

Figure 16:
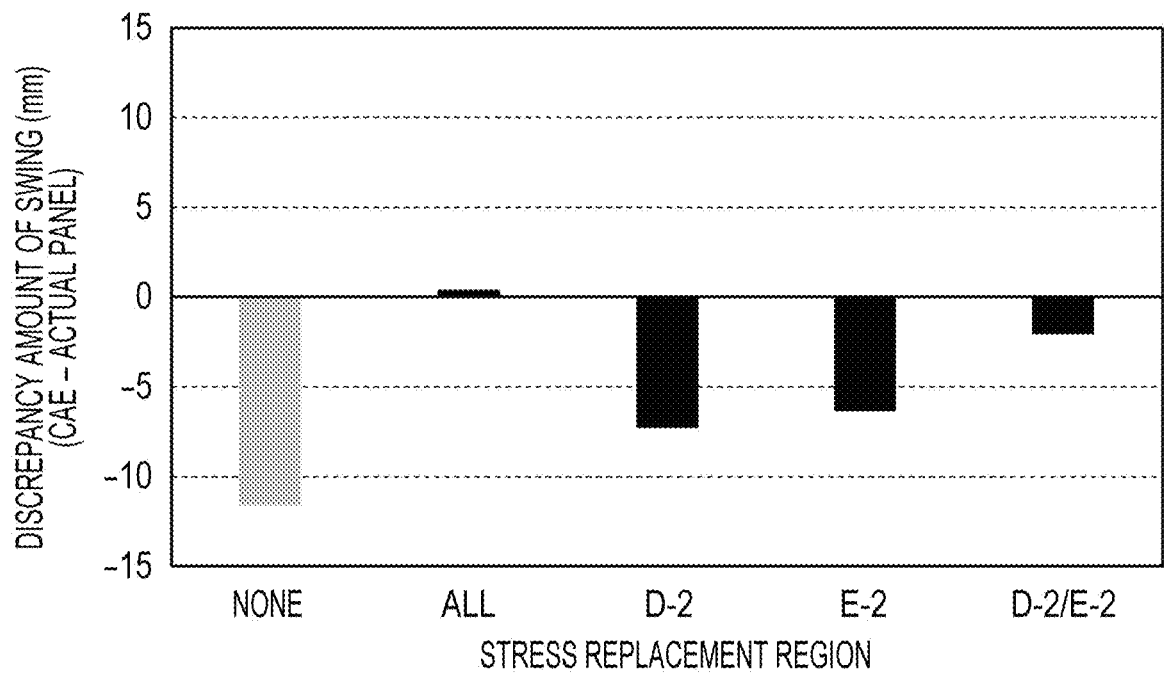
FIG. 16 is a graph illustrating a region in which the stress distribution at the forming bottom dead center of the CAE analysis is replaced with the stress distribution of an actual panel and the amount of discrepancy between the swing calculated by the CAE analysis and the swing of the actual panel when the stress distribution is changed.

First, FIG. 16 illustrates the result obtained by determining whether the discrepancy in swing amount between the CAE analysis and the actual panel is reduced.

FIG. 16 is a graph illustrating the result (the discrepancy amount) obtained by subtracting the swing amount in the actual panel from the swing amount in the CAE analysis, and the vertical axis denotes discrepancy amount, and the horizontal axis denotes stress replacement region. On the horizontal axis, "NONE" is the case where there is no stress replacement region, and in this case, the discrepancy amount is −11.6 mm, which is the difference between the CAE analysis and the actual panel. In addition, "ALL" is the case where all the regions of the driving stress distribution of the CAE analysis are replaced with the driving stress distribution of the actual panel, and in this case, the discrepancy amount is substantially zero.

In contrast, when the stress distribution of the actual panel is replaced only in the region D-2 or the region E-2, which has been identified in the present embodiment, the discrepancy in swing amount between the CAE analysis and the actual panel was reduced in each case as indicated by "D-2" and "E-2" in FIG. 16.

In addition, it was indicated by "D-2" and "E-2" that the discrepancy in swing amount between the CAE analysis and the actual panel was able to be further reduced by replacing the stress distribution of the actual panel in both the regions D-2 and E-2.

Figure 17:
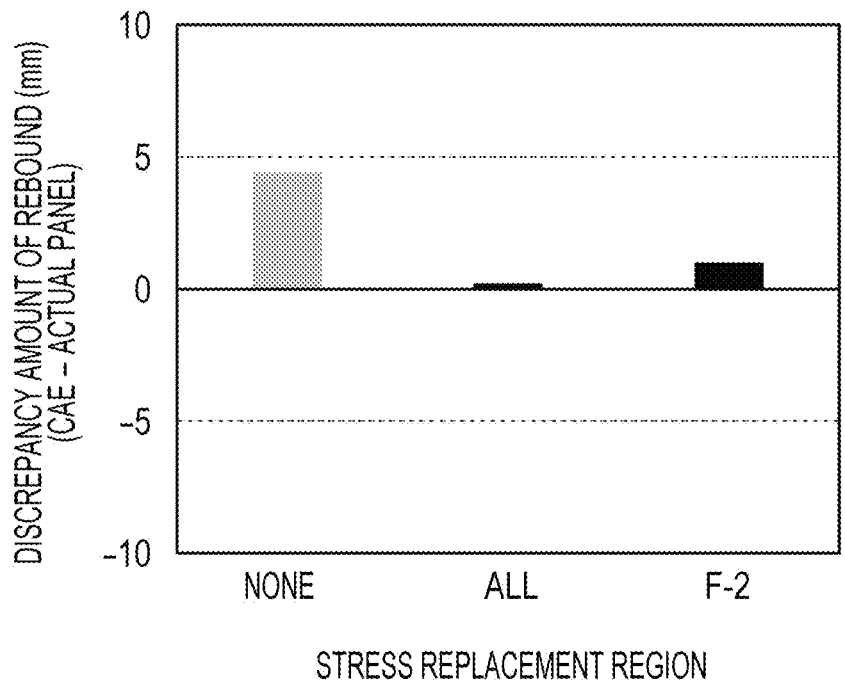
FIG. 17 is a graph illustrating the region in which the stress distribution at the forming bottom dead center of the CAE analysis is replaced with the stress distribution of the actual panel and the amount of discrepancy between the rebound calculated by the CAE analysis and the rebound of the actual panel when the stress distribution is changed.

Similarly, FIG. 17 illustrates the result obtained by determining whether the discrepancy in rebound amount between the CAE analysis and the actual panel is reduced. Also regarding the discrepancy in rebound amount, as denoted by "F-2", the discrepancy in rebound amount between the CAE analysis and the actual panel was reduced by replacing the stress distribution of the region F-2 at the forming bottom dead center with the stress distribution of the actual panel.

This result demonstrates that the portion identified by the springback amount discrepancy factor portion identification method according to the present embodiment is reasonable to be a portion that is a factor causing the discrepancy in springback amount between the CAE analysis and the actual panel.

As described above, it was demonstrated that a portion that is a factor causing the discrepancy in springback amount between the CAE analysis and the actual panel was able to be accurately identified by the method according to the present embodiment.

By identifying a portion that is a factor causing the discrepancy in springback amount in the manner described above, the adjustment operation for the die, the forming conditions, or the like performed in order to bring the shape obtained by the CAE analysis and the shape of the actual panel after the actual panel has been released from the die close to each other can be efficiently performed.

In addition, the reproducibility of the springback analysis can be improved by reviewing the settings on the CAE analysis and the shape of the die focusing on the identified portion, and the usefulness of the measures against springback that are based on the CAE analysis can be ensured.

Note that, in the present embodiment, although a stress difference distribution is changed by eliminating the stress difference in at least one region (by setting all components to zero), the method of changing a stress difference distribution is not limited to this, and a stress difference distribution may be changed by eliminating a component in at least one direction from the stress difference distribution, multiplying the component in the at least one direction by a constant in the stress difference distribution, adding a constant to the component in the at least one direction in the stress difference distribution, raising the component in the at least one direction to the power of a constant in the stress difference distribution, replacing the component in the at least one direction in the stress difference distribution with an average value in a sheet thickness direction of a work material, or replacing the component in the at least one direction in the stress difference distribution with a median value in the sheet thickness direction of the work material.

Second Embodiment

The springback amount discrepancy factor portion identification method described in the first embodiment can be realized by causing a personal computer (PC) to execute a preset program. An example of such an apparatus will now be described in the second embodiment.

Figure 18:
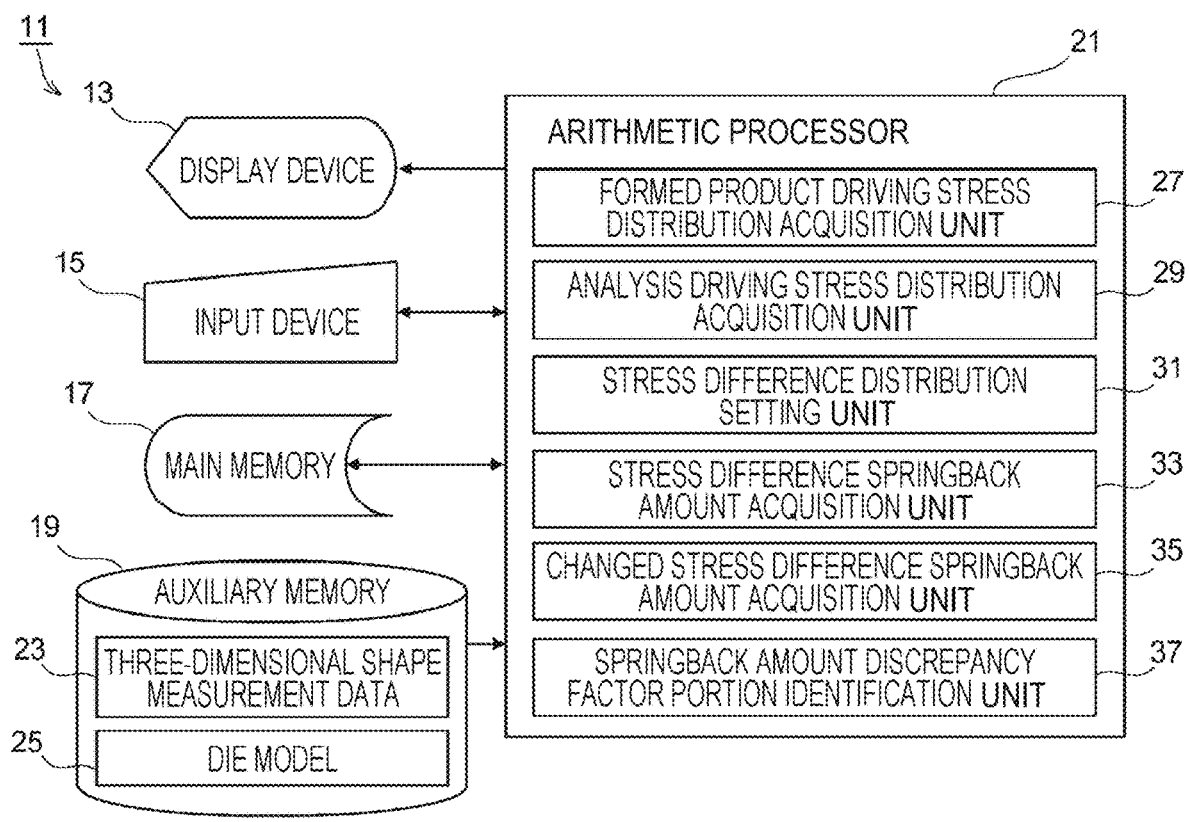
FIG. 18 is a block diagram illustrating a configuration of a springback amount discrepancy factor portion identification apparatus according to the second embodiment.

A springback amount discrepancy factor portion identification apparatus 11 according to the present embodiment includes a display device 13, an input device 15, a main memory 17, an auxiliary memory 19, and an arithmetic processor 21, each of which is illustrated in FIG. 18 as an example. The display device 13, the input device 15, the main memory 17, and the auxiliary memory 19 are connected to the arithmetic processor 21 and perform functions in response to a command from the arithmetic processor 21.

The display device 13 is used for displaying an execution result or the like and is formed of, for example, a liquid crystal monitor. The input device 15 is used by an operator who performs an input operation or the like and is formed of, for example, a keyboard or a mouse. The main memory 17 is used for temporarily storing data used by the arithmetic processor 21, performing a calculation, or the like and is formed of, for example, RAM. The auxiliary memory 19 is used for storing data or the like and is formed of, for example, a hard disk.

The auxiliary memory 19 stores at least three-dimensional shape measurement data 23 and various data items that are required for a CAE analysis of a die model 25 or the like.

The arithmetic processor 21 is formed of, for example, a CPU such as a PC. As a result of the arithmetic processor 21 executing preset programs, the formed product driving stress distribution acquisition unit 27, analysis driving stress distribution acquisition unit 29, stress difference distribution setting unit 31, stress difference springback amount acquisition unit 33, changed stress difference springback amount acquisition unit 35, and springback amount discrepancy factor portion identification unit 37 are constructed.

The formed product driving stress distribution acquisition unit 27 performs processing similar to the formed product driving stress distribution acquisition step S1 described in the first embodiment. Similarly, the analysis driving stress distribution acquisition unit 29 performs the analysis driving stress distribution acquisition step S3. The stress difference distribution setting unit 31 performs the stress difference distribution setting step S5. The stress difference springback amount acquisition unit 33 performs the stress difference springback amount acquisition step S7. The changed stress difference springback amount acquisition unit 35 performs the changed stress difference springback amount acquisition step S9. The springback amount discrepancy factor portion identification unit 37 performs the springback amount discrepancy factor portion identification step S11.

According to the present embodiment, which has been described above, a portion that is a factor causing a discrepancy in springback amount between a CAE analysis and an actual panel can be accurately identified as in the first embodiment.

Thus, various adjustment operations for bringing the shape obtained by a CAE analysis and the shape of an actual panel after the actual panel has been released from the die close to each other on the basis of the identified portion can be efficiently performed, and in addition, the usefulness of the measures against springback can be ensured.

The disclosed embodiments are applicable not only to an end formed product (the shape of a product) but also to a product in the process of being formed in the case of a press-formed product for which forming processes are performed separately. In addition, in the above-described embodiments, although a case has been described in which a steel sheet is used as a work material, the disclosed embodiments are also applicable to an aluminum sheet.

The invention claimed is:

1. A springback amount discrepancy factor portion identification method for identifying a portion of a shape of a press-formed product formed by press forming an actual panel, the portion being a factor causing a discrepancy between an amount of springback in the press-formed product and an amount of springback obtained by a springback analysis that is performed on an analysis model having the same shape as the press-formed product, the method comprising:

a formed product driving stress distribution acquisition step of generating a press-formed product model by using three-dimensional shape measurement data that is obtained by measuring a surface shape of the analysis model having the same shape as the press-formed product after the analysis model having the same shape as the press-formed product has been released from a die, performing a mechanical analysis where the press-formed product model is sandwiched by a die model to a forming bottom dead center, and acquiring a stress distribution at the forming bottom dead center as a formed product driving stress distribution contributing to the springback in the analysis model having the same shape as the press-formed product;

an analysis driving stress distribution acquisition step of acquiring a stress distribution at the bottom dead center in the springback analysis and a residual stress distribution after the analysis model having the same shape as the press-formed product has been released from the die and acquiring a difference between the stress distribution at the bottom dead center and the residual stress distribution after the analysis model having the same shape as the press-formed product has been released from the die as an analysis driving stress distribution in the springback analysis;

a stress difference distribution setting step of obtaining a stress difference distribution from a difference between the analysis driving stress distribution and the formed product driving stress distribution and setting the stress difference distribution as the stress difference distribution in the shape of the analysis model having the same shape as the press-formed product at the bottom dead center in the springback analysis;

a stress difference springback amount acquisition step of acquiring a springback amount by performing a springback analysis based on the set stress difference distribution, wherein, in the stress difference springback amount acquisition step, the springback analysis is based on the stress difference distribution obtained from the difference between the analysis driving stress distribution for the analysis model and the formed product driving stress distribution for the press-formed product;

a changed stress difference springback amount acquisition step of changing a stress difference value in a region of the stress difference distribution set in the stress difference distribution setting step and acquiring a springback amount by performing a springback analysis based on the changed stress difference distribution; and a springback amount discrepancy factor portion identification step of identifying the portion of the shape of the press-formed product, the portion being the factor causing the discrepancy in springback amount between the press-formed product and the springback analysis, by comparing the springback amount acquired in the changed stress difference springback amount acquisition step and the springback amount acquired in the stress difference springback amount acquisition step, wherein the die is adjusted based on the identified portion of the shape of the press-formed product.

2. The springback amount discrepancy factor portion identification method according to claim 1, wherein, in the changed stress difference springback amount acquisition step, a stress difference value is changed by:

eliminating a component in at least one direction from the stress difference distribution, multiplying the component in the at least one direction by a constant in the stress difference distribution, adding a constant to the component in the at least one direction in the stress difference distribution, raising the component in the at least one direction to the power of a constant in the stress difference distribution, replacing the component in the at least one direction in the stress difference distribution with an average value in a sheet thickness direction of a work material, or replacing the component in the at least one direction in the stress difference distribution with a median value in the sheet thickness direction of the work material.

3. A springback amount discrepancy factor portion identification apparatus configured to identify a portion of a shape of a press-formed product formed by press forming an actual panel, the portion being a factor causing a discrepancy between an amount of springback in the press-formed product and an amount of springback obtained by a springback analysis that is performed on an analysis model having the same shape as the press-formed product, the apparatus comprising:

a formed product driving stress distribution acquisition unit configured to generate a press-formed product model by using three-dimensional shape measurement data that is obtained by measuring a surface shape of the analysis model having the same shape as the press-formed product after the analysis model having the same shape as the press-formed product has been released from a die, preform a mechanical analysis where the press-formed product model is sandwiched by a die model to a forming bottom dead center, and acquire a stress distribution at the forming bottom dead center as a formed product driving stress distribution contributing to the springback in the analysis model having the same shape as the press-formed product;

an analysis driving stress distribution acquisition unit configured to acquire a stress distribution at the bottom dead center in the springback analysis and a residual stress distribution after the analysis model having the same shape as the press-formed product has been released from the die and acquiring a difference between the stress distribution at the bottom dead center and the residual stress distribution after the analysis model having the same shape as the press-formed product has been released from the die as an analysis driving stress distribution in the springback analysis;

a stress difference distribution setting unit configured to obtain a stress difference distribution from a difference between the analysis driving stress distribution and the formed product driving stress distribution and set the stress difference distribution as the stress difference distribution in the shape of the analysis model having the same shape as the press-formed product at the bottom dead center in the springback analysis;

a stress difference springback amount acquisition unit configured to acquire a springback amount by performing a springback analysis based on the set stress difference distribution, wherein, the springback analysis performed by the stress difference springback amount acquisition unit is based on the stress difference distribution obtained from the difference between the analysis driving stress distribution for the analysis model and the formed product driving stress distribution for the press-formed product;

a changed stress difference springback amount acquisition unit configured to change a stress difference value in a region of the stress difference distribution set by the stress difference distribution setting unit and acquire a springback amount by performing a springback analysis based on the changed stress difference distribution;

a springback amount discrepancy factor portion identification unit configured to identify the portion of the shape of the formed product, the portion being the factor causing the discrepancy in springback amount between the press-formed product and the springback analysis, by comparing the springback amount acquired by the changed stress difference springback amount acquisition unit and the springback amount acquired by the stress difference springback amount acquisition unit, wherein the die is adjusted based on the identified portion of the shape of the press-formed product.

4. The springback amount discrepancy factor portion identification apparatus according to claim 3, wherein the changed stress difference springback amount acquisition unit changes a stress difference value by:

eliminating a component in at least one direction from the stress difference distribution, multiplying the component in the at least one direction by a constant in the stress difference distribution, adding a constant to the component in the at least one direction in the stress difference distribution, raising the component in the at least one direction to the power of a constant in the stress difference distribution, replacing the component in the at least one direction in the stress difference distribution with an average value in a sheet thickness direction of a work material, or replacing the component in the at least one direction in the stress difference distribution with a median value in the sheet thickness direction of the work material.

5. A non-transitory computer readable medium storing a program for identifying a portion of a shape of a press-formed product formed by press forming an actual panel, the portion being a factor causing a discrepancy between an amount of springback in the press-formed product and an amount of springback obtained by a springback analysis that is performed on an analysis model having the same shape as the press-formed product, the program causing a processor to execute:

a formed product driving stress distribution acquisition step of generating a press-formed product model by using three-dimensional shape measurement data that is obtained by measuring a surface shape of the analysis model having the same shape as the press-formed product after the analysis model having the same shape as the press-formed product has been released from a die, performing a mechanical analysis where the press-formed product model is sandwiched by a die model to a forming bottom dead center, and acquiring a stress distribution at the forming bottom dead center as a formed product driving stress distribution contributing to the springback in the analysis model having the same shape as the press-formed product;

an analysis driving stress distribution acquisition step of acquiring a stress distribution at the bottom dead center in the springback analysis and a residual stress distribution after the analysis model having the same shape as the press-formed product has been released from the die and acquiring a difference between the stress distribution at the bottom dead center and the residual stress distribution after the analysis model having the same shape as the press-formed product has been released from the die as an analysis driving stress distribution in the springback analysis;

a stress difference distribution setting step of obtaining a stress difference distribution from a difference between the analysis driving stress distribution and the formed product driving stress distribution and setting the stress difference distribution as the stress difference distribution in the shape of the analysis model having the same shape as the press-formed product at the bottom dead center in the springback analysis;

a stress difference springback amount acquisition step of acquiring a springback amount by performing a springback analysis based on the set stress difference distribution, wherein, in the stress difference springback amount acquisition step, the springback analysis is based on the stress difference distribution obtained from the difference between the analysis driving stress distribution for the analysis model and the formed product driving stress distribution for the press-formed product;

a changed stress difference springback amount acquisition step of changing a stress difference value in a region of the stress difference distribution set in the stress difference distribution setting step and acquiring a springback amount by performing a springback analysis based on the changed stress difference distribution; and a springback amount discrepancy factor portion identification step of identifying the portion of the shape of the press-formed product, the portion being the factor causing the discrepancy in springback amount between the press-formed product and the springback analysis, by comparing the springback amount acquired in the changed stress difference springback amount acquisition step and the springback amount acquired in the stress difference springback amount acquisition step, wherein the die is adjusted based on the identified portion of the shape of the press-formed product.

6. The non-transitory computer readable medium according to claim 5, wherein, in the changed stress difference springback amount acquisition step, a stress difference value is changed by:

eliminating a component in at least one direction from the stress difference distribution, multiplying the component in the at least one direction by a constant in the stress difference distribution, adding a constant to the component in the at least one direction in the stress difference distribution, raising the component in the at least one direction to the power of a constant in the stress difference distribution, replacing the component in the at least one direction in the stress difference distribution with an average value in a sheet thickness direction of a work material, or replacing the component in the at least one direction in the stress difference distribution with a median value in the sheet thickness direction of the work material.

\* \* \* \* \*